J. R. McPHILLIPS AND H. S. BOWES.
ATTACHMENT FOR PHONOGRAPHS.
APPLICATION FILED MAR. 29, 1921.

1,410,108.

Patented Mar. 21, 1922.

WITNESSES

INVENTOR
J. R. McPhillips,
H. S. Bowes,
BY
ATTORNEYS

J. R. McPHILLIPS AND H. S. BOWES.
ATTACHMENT FOR PHONOGRAPHS.
APPLICATION FILED MAR. 29, 1921.

1,410,108.

Patented Mar. 21, 1922.

WITNESSES

INVENTOR
J. R. McPhillips,
H. S. Bowes,
BY
ATTORNEYS

UNITED STATES PATENT OFFICE.

JOHN RALPH McPHILLIPS AND HAROLD STRATHMORE BOWES, OF LONDON, ONTARIO, CANADA.

ATTACHMENT FOR PHONOGRAPHS.

1,410,108.  Specification of Letters Patent.  Patented Mar. 21, 1922.

Application filed March 29, 1921. Serial No. 456,733.

*To all whom it may concern:*

Be it known that we, JOHN RALPH McPHILLIPS and HAROLD STATHMORE BOWES, subjects of the King of Great Britain, and residents of London, in the Province of Ontario and Dominion of Canada, have invented certain new and useful Improvements in Attachments for Phonographs, of which the following is a specification.

The present invention relates to attachments for phonographs or the like, and has for its object to provide a device of this character which is of simple, durable and attractive construction easy and inexpensive to manufacture and apply to the cabinet of the phonograph or like support, which is especially adapted to carry the reproducer when it is disconnected from the tone arm in such a manner as to relieve its elements of any stresses which would tend to impair its reproducing qualities or its organization in general, which provides containers for phonograph needles and the like and which is adapted for organization with different styles of cabinets or the like.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1:
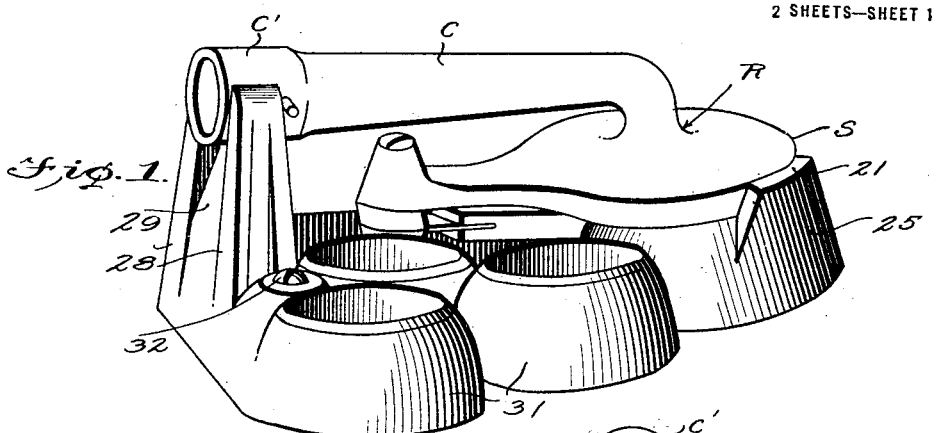
Figure 1 is a perspective view of the attachment.

Referring to the drawings wherein for the sake of illustration is shown the preferred embodiments of the invention, it will be seen that in all embodiments the invention is adapted to carry the reproducer of a phonograph when it is disconnected from the tone arm. The reproducer which is designated generally at R includes a sound box S having a diaphragm casing D, a floating weight W and stylus or needle N. A conduit C leads from the sound box, and has its end C' adapted for coupling with the tone arm.

Figure 2:
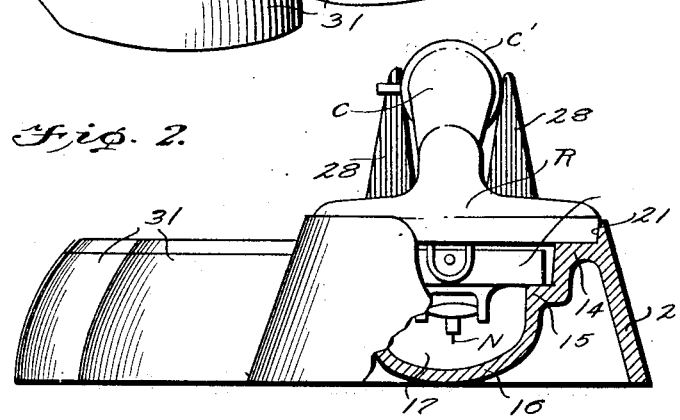
Figure 2 is a front elevational view thereof, parts being broken away and shown in section for the sake of illustration.
Figure 3:
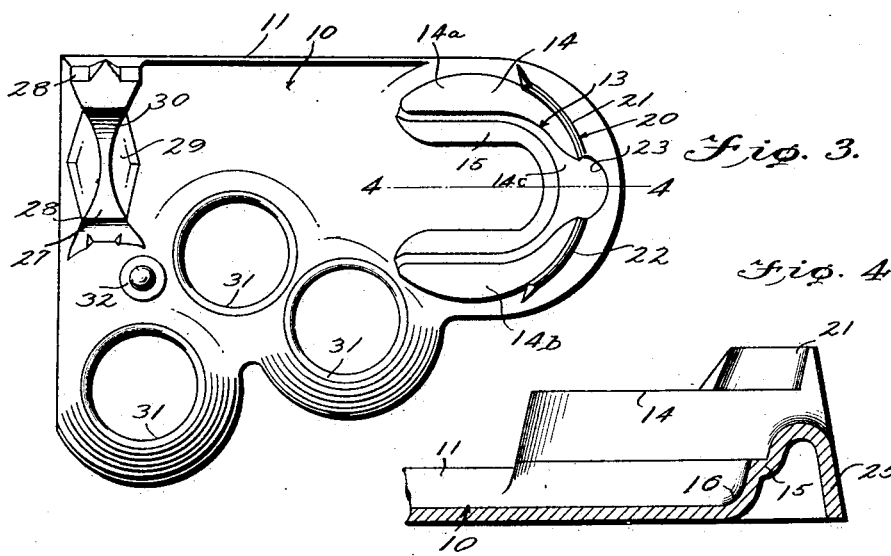
Figure 3 is a plan view thereof.
Figure 4:
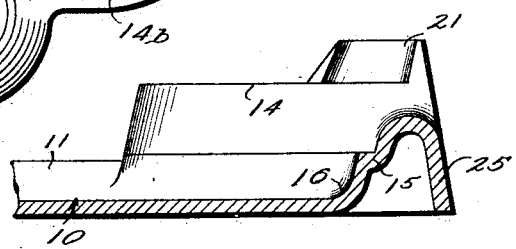
Figure 4 is a fragmentary view in vertical section on line 4—4 of Figure 3.

Referring now especially to Figures 1 to 3 the numeral 10 designates the frame or body portion of the attachment. The frame includes an integral flange 11. At one end the frame carries a support, designated generally at 13, for the sound box S. The support 13 is preferably cast integral with the frame and includes steps 14 and 15 constituting independent supports for the diaphragm casing and floating weight, respectively. The step 14 consists of sections $14^a$ and $14^b$ which define a gap $14^c$. A cup 16 depends from the lower step and opens to the frame at its inner end. It defines a chamber or cavity 17 adapted to accommodate the needle or stylus N. An interrupted ledge, designated generally at 20, and consisting of sections 21 and 22, is integrally formed with the upper step 14 and extends around the outer marginal edge thereof for a substantial distance. The sections of the interrupted flange abut the diaphragm casing and define a gap 23 between them and this gap together with the gap $14^c$ facilitates the entrance of the stylus into its cavity. An inclined wall 25 depends from the upper step and serves to sustain the support.

A pedestal, designated generally at 27, upstands from the frame at the opposite end from the support and includes spaced standards 28 connected by an integral web 29. The standards project upwardly beyond the web and these projecting ends and the top of the web are rounded or otherwise suitably formed to constitute a seat 30 for the coupling end C' of the conduit C.

A series of needle cups, designated generally at 21 is provided at the side of the frame opposite the flange 11. These needle cups are triangularly arranged in this embodiment and upstand from the frame. An attaching boss 32 is formed on the frame intermediate the needle cups and the pedestal and affords a means whereby the attachment may be secured in position.

The base or underside of the frame 10, of the wall 25, and of the needle cups are all coplanar so that the attachment presents a flat base and a structure of great rigidity adapted to be advantageously supported upon a flat surface. Screws or other suitable fastening means may cooperate with the attaching boss 32 to secure the device in position.

In the use of this device when the reproducer is detached from the tone arm it is placed upon the atttachment with the sound box upon the support and with its conduit upon the pedestal. The major elements of the sound box are independently supported and are relieved of any stresses which might impair their sound reproducing qualities or their general organization. The step 14 affords a seat for the diaphragm casing and the step 15 affords a seat for the floating weight. The cup 16 defines the chamber 17 and thus accommodates the stylus out of contact with its wall and insured against injury. The open end of the cup and the safety gap provided in the interrupted flange and in the upper step facilitates the placing of the sound box upon the support and minimizes the liability of injury to the needle during this operation. Lateral displacement of the reproducer is prevented by the retaining ledges 21. The conduit C is supported by the pedestal 27 and is prevented from lateral displacement from its seat thereon by means of the projecting ends of the standards. At the same time the attachment presents a needle cup arrangement both convenient and apt.

Figure 5:
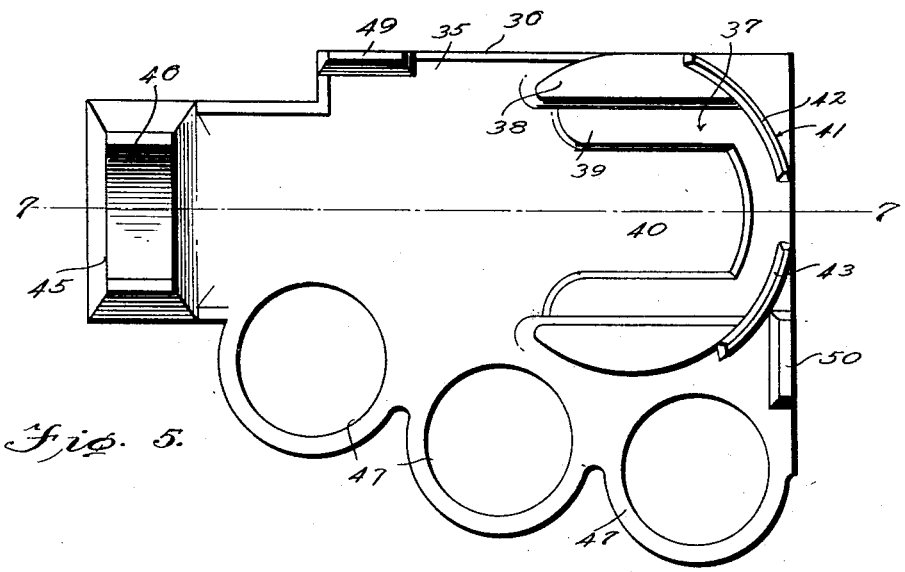
Figure 5 is a plan view of a slightly modified form.
Figure 6:
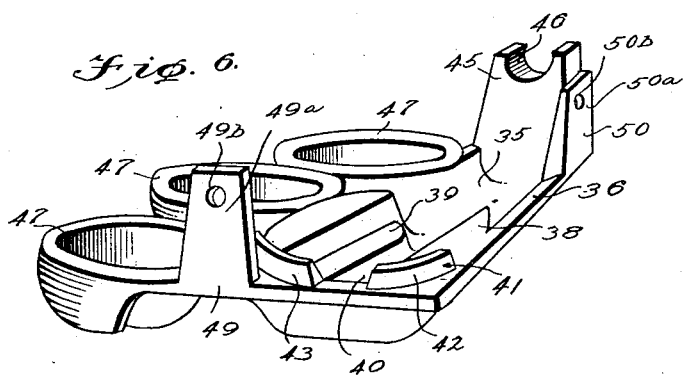
Figure 6 is a perspective view thereof.
Figure 7:
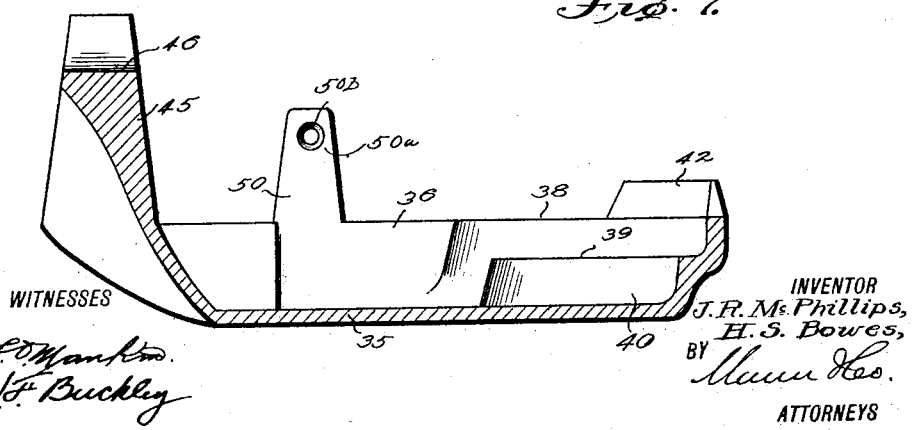
Figure 7 is a vertical sectional view on line 7—7 of Figure 5.

In Figures 5, 6 and 7 there is shown a slightly modified form of the invention which is especially adapted among other things to be inset in the cabinet or the like with which it is associated. The attachment in this embodiment includes a frame 35 having a flange 36 along one side. The support designated generally at 37 is arranged at one end and includes as in the previous embodiment upper and lower steps 38 and 39 constituting seats for the elements of the reproducer and a chamber 40 for accommodating the stylus. A ledge 41 including sections 42 and 43 is formed around the outer marginal edge of the upper step and prevents lateral displacement of the reproducer. The pedestal 45 is arranged at the other end of the frame and includes a seat 46 for the end of the conduit. Along the side of the frame opposite the flange 36 a series of needle cups designated at 47 is provided and the arrangement of these needle cups is such that their centers lie at spaced points in the same arc. An attaching bracket 49 upstands from the frame at the end which carries the support 37 and this bracket presents a flat surface 49ᵃ adapted to abut the vertical wall of the cabinet and is provided with an aperture 49ᵇ to receive the shank of suitable fastening means. A complementary bracket 50 upstands from the frame contiguous to the pedestal and it is provided with a flat face 50ᵃ adapted to lie flush against another vertical wall of the cabinet and with an aperture 50ᵇ to receive the shank of suitable fastening means. In this form of the invention the support, and the needle cups depend below the frame and this feature together with the brackets 49 and 50 adapt the attachment to be inset in the table or the like of the cabinet.

We claim:

1. In an attachment for phonographs, a frame, a support for the sound box including steps constituting independent seats for the major elements of the sound box and having a cavity for accommodating the stylus thereof and a ledge for preventing lateral displacement, and a pedestal spaced from the support and having a seat for the conduit of the reproducer.

2. In an attachment for phonographs, a frame, a support for the sound box including steps constituting independent seats for the major elements of the sound box, and a pedestal spaced from the support and having a seat for the conduit of the reproducer.

3. In an attachment for phonographs, a frame, a support for the sound box arranged at one end of the frame including steps constituting independent seats for the major elements of the sound box and having a cavity for accommodating the stylus thereof, the upper of said seats being interrupted to define a gap, and an interrupted ledge carried by the upper of said seats for engaging the diaphragm casing for the sound box, a pedestal arranged at the other end of the frame and including a pair of standards and an interrupted web, said standards projecting at their upper ends beyond the webs, and said standards and said webs having their upper ends formed to constitute a seat for the conduit of the reproducer.

JOHN RALPH McPHILLIPS.
HAROLD STRATHMORE BOWES.